's Patent

United States Patent [19]
Walter

[11] 3,717,859
[45] Feb. 20, 1973

[54] SUPERVISORY OR MONITORING APPARATUS
[75] Inventor: Jack C. Walter, Falcon Heights, Minn.
[73] Assignee: Honeywell Inc., Minneapolis, Minn.
[22] Filed: Jan. 20, 1970
[21] Appl. No.: 4,242

[52] U.S. Cl............340/213 R, 340/248 A, 318/184
[51] Int. Cl...............................................G08b 21/00
[58] Field of Search...340/213 R, 248 A, 248, 248 B, 340/263, 271; 318/184

[56] References Cited

UNITED STATES PATENTS

| | | | |
|---|---|---|---|
| 3,146,433 | 8/1964 | Hurlburt | 340/271 |
| 3,334,342 | 8/1967 | Blackman | 340/271 |
| 2,415,405 | 2/1947 | Barney | 318/184 |
| 3,140,435 | 7/1964 | Winslow | 318/184 |
| 3,195,032 | 7/1965 | Shonnard | 318/184 |
| 3,238,432 | 3/1966 | Amberger | 318/184 |

Primary Examiner—Thomas B. Habecker
Attorney—Charles J. Ungemach, Ronald T. Reiling and Gordon Reed

[57] ABSTRACT

A spin motor rotation detector for a split phase or two phase motor drive for a gyroscope applies the spin motor supply voltage and the phase winding voltage to a semi-conductor, e.g., the supply voltage is applied as a reference voltage to the gate on a semi-conductor such as a FET used as a demodulator while the phased motor winding provides the source or (signal) input voltage to the FET demodulator. The phase modulation of the phase winding voltage resulting from hunting during operation of the motor is reflected in the output from the demodulator, and the output is applied to a logic level DC output to indicate satisfactory or unsatisfactory speed of operation of the split phase motor during changes in physical orientation of the gyroscope.

6 Claims, 3 Drawing Figures

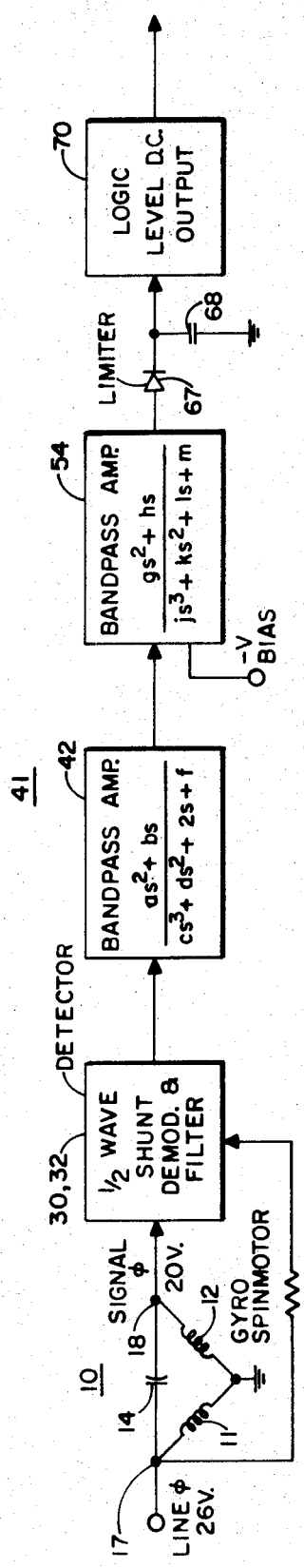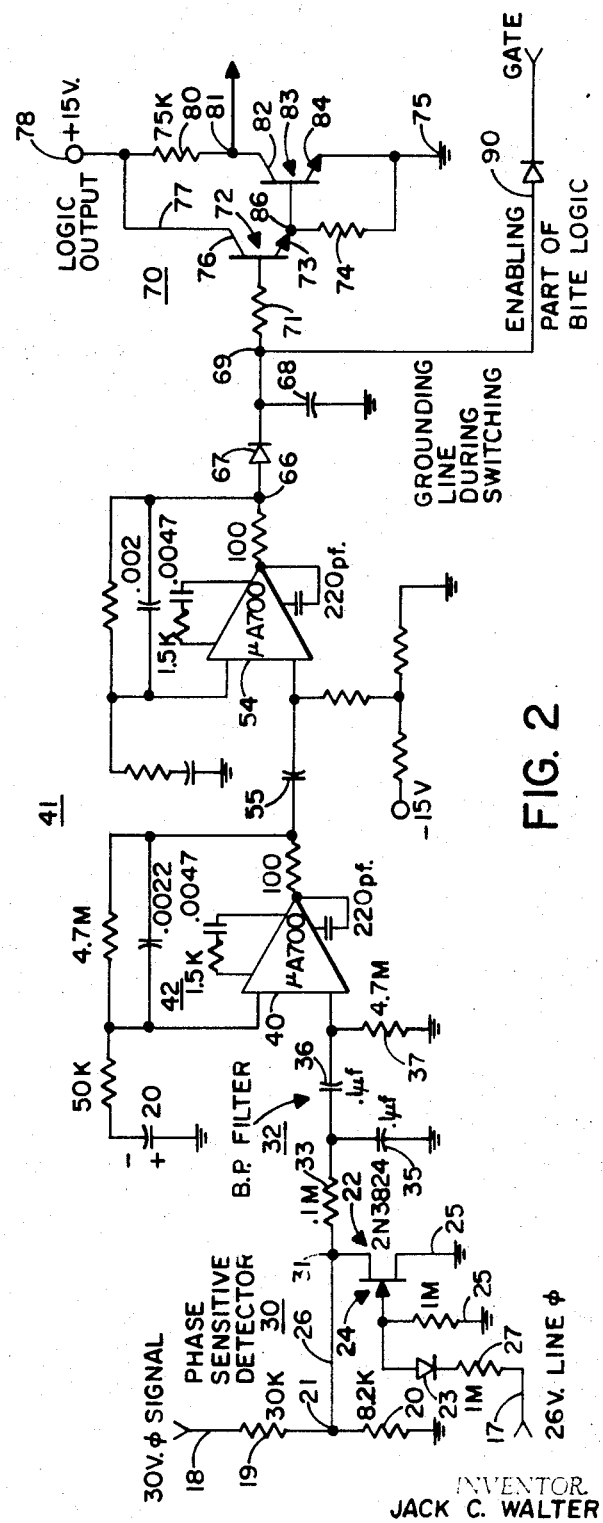

SUPERVISORY OR MONITORING APPARATUS

BACKGROUND OF THE INVENTION

This invention is in the field of supervisory apparatus encompassing a prior application of Paul H. Leffmann, Ser. No. 520,400 filed Jan. 13, 1966, now abandoned, and continued in application Ser. No. 797,355 filed Jan. 27, 1969.

This invention relates to supervisory or monitoring apparatus for split phase motors such as are used in driving the rotor of gyroscopes. The apparatus ascertains whether such motors are properly operating during changes in physical orientation of the gyroscope.

BRIEF SUMMARY OF THE INVENTION

Many gyroscopes used in navigation equipment for aircraft have a rotor that is driven by a split phase AC motor. Such gyroscopes are subject to physical changes in orientation during flight operation of the aircraft. The change in orientation which may result in changes in bearing friction for the gyroscope rotor tends to decrease the rotor speed. With the change in orientation completed, the motor energized from the AC source will speed up the rotor rate. During such speeding up of the rotor, the rotor speed will hunt about the synchronous speed for the motor.

This hunting action is reflected in a phase modulation of the phased winding voltage of the split phase motor. However, this hunting is associated with the normal operation of such motor, and in fact such hunting operating is a measure of whether the motor is operating satisfactorily or not.

In the present instance the phased winding voltage is demodulated with respect to the line winding voltage to obtain its phase information. The phased winding voltage is phase modulated by the hunting effect on the motor speed, and the demodulator output will be phase demodulated. The resultant modulation envelope contains a great deal of 400 cps component, the frequency of the line voltage. This 400 cycle component may be roughly about 15 volts compared to the low level, about 5 millivolt, hunting component. Therefore the modulation envelope must be subjected to filtering to separate the excitation from the hunt frequency before it is applied to a band pass amplifier and finally to the logic decision circuit for determining proper speed of the motor.

The total spin motor rotation detector circuitry to monitor a plurality of gyros such as three gyros requires substantial duplication of the apparatus disclosed herein required for one gyroscope.

For a more complete understanding of the invention reference is made to the following description and drawing showing a preferred embodiment of the invention:

FIG. 1 is a block diagram of an arrangement for monitoring one gyroscope;

FIG. 2 is an electrical schematic of such monitoring apparatus;

DETAILED DESCRIPTION OF THE PREFERRED EMBODIMENT

Figure 3:
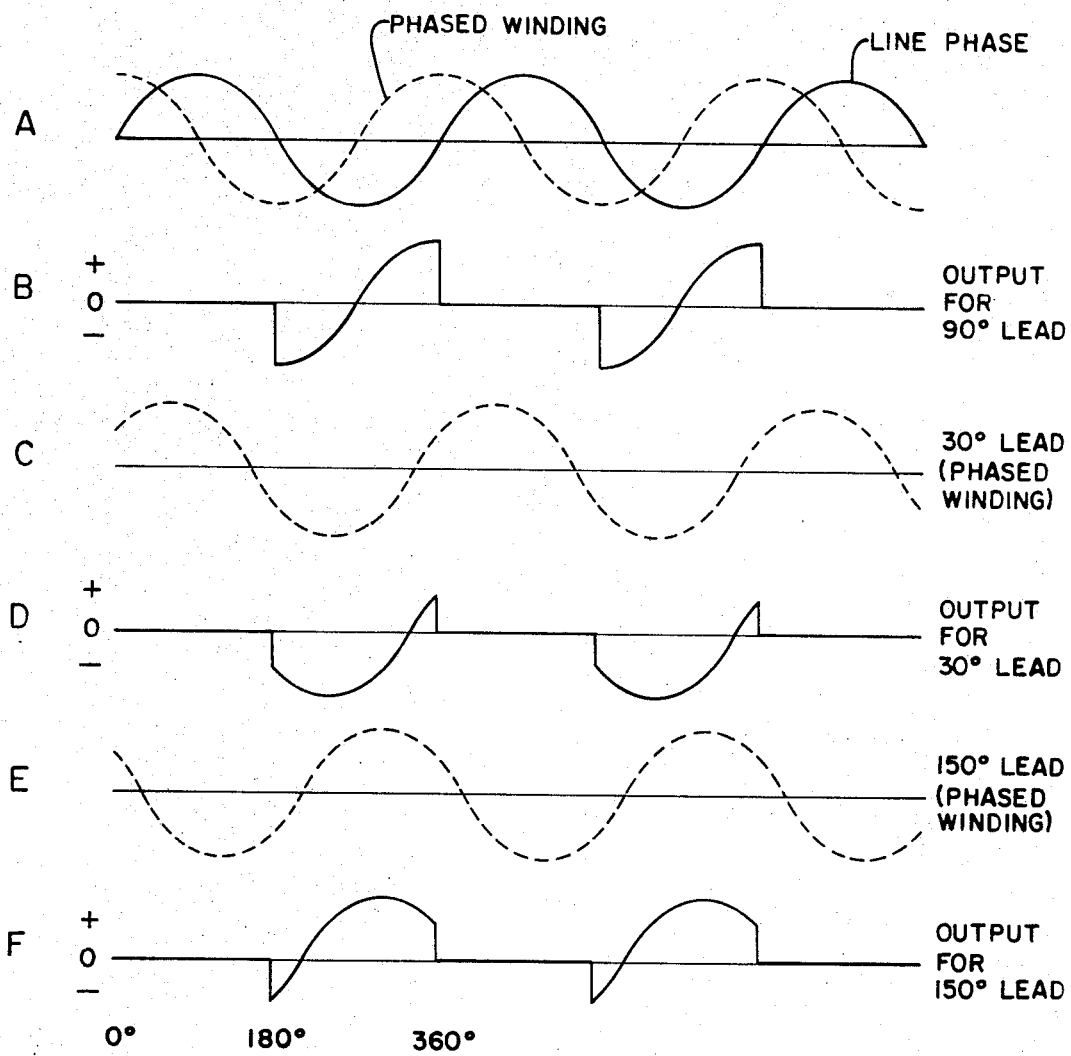
FIG. 3 shows the output wave forms from the detector used in the monitoring system for various phase angles of the line and phased winding voltages.

Referring to FIG. 1, a split phase motor 10 comprises a line winding 11 and a phased winding 12. Winding 11 is directly connected to a terminal 17 which is energized from a 26V, 400 cycle AC source. The opposite end of winding 11 is connected to ground. Winding 12 has one end connected to ground, and its opposite end is connected to a terminal 18. A capacitor 14 is connected between terminals 17 and 18 whereby winding 12 is the phased winding of the split phase AC motor. This motor 10 may be used to drive the rotor (not shown) of a gyroscope with the rotor being mounted in a cross gimbal support.

Terminals 17 and 18 are connected to a half wave shunt demodulator and filter 30, 32 whereby the voltage of the line winding 11 and the voltage of the phased winding 12 are supplied thereto.

The half wave shunt demodulator and filter 30, 32 has its output supplied to a tuned amplifier arrangement 41 comprising two distinct amplifiers 42, 54 connected in electrical series. The output of the second amplifier 54 is supplied to a limiter 67 which in turn has its output supplied to a logic level DC output device 70. The output from the logic level DC 70 supplies a "go" or "no go" signal, indicative of the proper or improper operation of the motor 10.

Continuing to the detailed description of the arrangement in FIG. 2, the spin motor rotation detector circuit comprises: a half wave shunt demodulator or phase sensitive detector 30, a band pass filter 32, two RC tuned band pass amplifiers 42, 54 coupled by a high pass filter 55, a limiter 67, and a logic arrangement 70.

The phase sensitive detector 30 includes a field effect transistor semiconductor 22 hereinafter termed a FET 22 having a gating control element 24. Extending in electrical series from the line winding voltage terminal 17 to ground, is a resistor 27, a diode 23, and a second resistor 25. The gating element of FET 22 is connected to the junction of diode 23 and resistor 25. The drain circuit of FET 22 includes a terminal 31 connected through a conductor 26 to a terminal 21 of a voltage dropping arrangement comprising resistors 19 and 20 connected in electrical series. The end of resistor 19 remote from terminal 21 is connected to terminal 18 to receive the phased winding voltage and the remote end of resistor 20 is connected to ground.

Thus in phase sensitive detector 30, the voltage from the phased winding 12 is phase demodulated by the FET demodulator with respect to line winding voltage. Since the voltage of the phased winding 12 is phase modulated by the hunting effect inherent in such motor, the output voltage from the phase sensitive detector 30 will be phase demodulated. The resultant modulation envelope contains a great deal of 400 cps component of a magnitude about 15 volts compared to the low level, about 0.5 millivolts, hunting component.

For separating the low hunt frequency voltage component (5 millivolts) from the 400 cycle excitation voltage, the output of the phase sensitive detector is supplied to a band pass filter 32. Filter 32 comprises a resistor 33 and a capacitor 35 connected in electrical series between terminal 31 and signal ground; additionally a capacitor 36 and resistor 37 are also connected in electrical series between the terminal of resistor 33 and capacitor 35 and signal ground. The junction of capacitor 36 and resistor 37 is connected to amplifier 40 as an input thereto. Band pass filter 32 filters at least some of the 400 cycle frequency voltage.

Amplifier 40 is included in amplifier section 42 of amplifier arrangement 41. Amplifier section 42 is provided with suitably arranged RC components to create a medium band width band pass amplifier whose center frequency is nominally at about 3 cps, substantially the hunt frequency. Resistive feedback sets the gain of each amplifier section at approximately 100 volts/volt at 3 cps while retaining a zero frequency (DC) gain of unity. The choice of capacitors in the feedback circuit is used to roll off the gain above and below the 3 cps center frequency to unity gain at DC and at a frequency somewhere below 400 cps.

Input to the amplifiers is by means of the non-inverting input terminals of the differential amplifier with the interstage capacitive coupling chosen to complement the low frequency roll off. An input filter to the first stage has component values chosen to complement the amplifier pass band resulting in an overall pass band of 0.6 cps to 7 cps. The low frequency roll off is +24db/octave to unity gain and +12db per octave below. The high frequency roll off is +18db per octave to unity gain and the +6db per octave for frequencies above the unity gain point.

The output from amplifier section 54 is transmitted to output terminal 66 and thence through the diode 67 to terminal 69 which represents input to the logic arrangement 70.

In logic arrangement 70, a resistor 71 extends from terminal 69 to the base of an NPN transistor 72 which has its emitter 73 connected through resistor 74 to signal ground 75. The collector 76 of transistor 72 is connected to a terminal 78 supplied from a +15 volt DC source.

The junction of emitter 73 and resistor 74 is connected to the base of a second NPN transistor 83 having its emitter 84 connected to signal ground 75 and its collector 82 connected through a resistor 80 to the +15 volt DC supply. The junction 81 of resistor 80 and collector 82 represents the output from the logic arrangement 70.

A control 90 extending from an enabling arrangement determines whether the logic arrangement 70 will be responsive to the phase sensitive detector 30.

FIG. 3 shows examples of curves in plots a, b, c, d, e and f. In a, the solid line represents the line winding voltage and the dotted line the phased winding voltage of motor 10 for synchronous speed operation.

Plot b shows the output from phase sensitive detector 30 at terminal 31 for the line winding and phase winding voltages when the motor is operating at synchronous speed. At this condition the phased winding voltage leads the line winding voltage by 90° as shown in plot a. As shown in plot b, there is no output from phase sensitive detector 30 when the line voltage (solid line of plot a) is positive.

Plot c represents the phased winding voltage with a 30° rather than 90° lead over the line winding voltage. The 30° lead that the phased winding voltage has with respect to the line winding voltage has been exaggerated for illustrative purposes.

Plot d shows the output of phase sensitive detector 30 in response to the condition shown in plot c. Again there is no output from the phase sensitive detector 30 at terminal 31 during times when the line winding voltage of plot a is positive. It should be noted that in plot d, there are greater areas of the plot below the zero ordinate than there are above the zero ordinate.

Plot e shows the phased winding voltage when it has a 150° lead over the line winding voltage. As with plot c, the lead shown in plot e has been exaggerated for illustrative purposes.

Plot f shows the response of detector 30 to the conditions shown in plot e. Note the greater areas above the zero ordinate of plot f than below.

The operation of detector 30 FIG. 2 may be described by reference to the plots of FIG. 3. The line phase voltage of the system is applied to the gate of FET 22 through a diode 23 and resistor 27, FIG. 2. The purpose of the diode is to allow the gate to swing negative but prevent the gate from going positive relative to ground and the FET source from terminal 17. The FET 22 becomes conductive when the gate is more positive than minus 4 volts and for a 26 volt rms line voltage, this means the FET conducts for most of the positive half cycle. During this conduction period terminal 31, the output terminal, is at substantially zero voltage. Hence, the detector 30 has zero output.

The phase winding voltage applied to terminal 18 is voltage divided using two resistors 19, 20. The voltage division serves a two fold purpose, bringing the voltage at junction 21 within the FET rating and limiting the current through the FET.

When the FET 22 turns on (during the positive half cycle) the junction 21 between resistors 19 and 20 is shorted to ground and the voltage at this point is therefore zero.

During the negative half cycle, the voltage at junction 21 is the divided phased winding voltage.

As stated, the three dotted traces shown in FIG. 3 plots a, c and e represent exaggerated conditions of winding to winding phase relationships. The output waveforms in plots b, d, and f of FIG. 3 show how the resulting detector output voltage has average values of zero, positive or negative dependent upon the average phase difference of the voltages in the line winding and phased winding.

If the phase difference is fluctuating, for example in a sinusoidal manner, an AC component would then be present in the detector output, and would have the frequency of the sinusoidal modulation. The fluctuation need not be a sine wave to be reflected in the output. However, in the case of synchronous motor rotor hunt this may approach a sine wave.

Consequently the output voltage of the detector will generally be of a finite DC level with an AC component on it due to rotor hunt. The phase difference between the line and phased windings will rarely be exactly 90°, the condition where the average output of the FET gate is zero (see FIG. 3, plot b).

Filter 32 consisting of lead and lag networks in series provides a band pass for the AC component of the output voltage at 31 and removes the steady state DC voltage in the output of demodulator 30 at that point.

Similar lead and lag networks appropriately located around the operational amplifiers, 40 for example in amplifier section 42, further sharpen the pass band definition of the system.

This three cycle per second (cps) hunt of rotor speed, which may be termed $H_z$, may also be viewed as hunting of the phased winding voltage vector. The voltage vector phase angle varies between 90° lead (quadrature), less than 90° lead and greater than 90° lead over the line winding voltage. Naturally oscillation of the relative phase angle between the phased winding voltage and the line winding voltage has a zero rate of change (first derivative) in phase angle at the extremities of the hunting position of the voltage vector of the phased winding. At an intermediate position, when the vector is at 90° lead, the rate of change of position of the phased winding voltage vector is greatest. Consequently at synchronous speed, since the rate of change of the phase angle of the phased winding voltage is greatest, a greater effect will be transmitted through capacitor 36 in the band pass filter 32. Under such conditions, the output of the amplifier section 42 will be at a maximum.

To prevent excessive overdrive of the second amplifier arrangement 54, which might occur when the gyro rotor hits synchronous speed, a limiter such as a diode bridge limiter may be placed between the amplifier sections 42 and 54 to limit the output voltage swing of the first amplifier section 42. This condition at synchronous speed provides the greatest three cycle component with other motor disturbances having lesser influence on the three cycle hunt signal amplitude.

It is evident that when there is a constant phase angle between the 400 cycle line winding voltage and the phased winding voltage there will be no output to logic 70, since there will be no AC voltage component from the detector 30. However, when the phase angle between the line winding and phased winding is fluctuating there will be an AC voltage component output from the phase sensitive detector that will operate logic 70.

Reviewing, in a two degree of freedom type gyroscope in an aircraft, when the aircraft changes attitude about the input axis of such gyroscope, the gyroscope will precess. Precession places an additional load on the bearings of the motor and it tends to lose speed momentarily. However, the motor tends to regain its normal operating speed. In so doing it will hunt about its normal operating speed. Such hunting rate is at about 3 cycles per second. This hunting action will develop an AC component output from detector 30, which output is applied to the logic arrangement 70. Such AC voltage on the base of transistor 72 results in conduction, and thus establishes positive voltage on the base of transistor 83. This causes conduction in transistor 83 thereby making terminal 81 substantially ground potential, indicating satisfactory operation of the motor 10. In the event that there is no such AC output from detector 30, there will be no output from logic arrangement 70 which indicates unsatisfactory operation of the motor 10.

A holding arrangement on the logic 70 is provided for enabling an AC input to function when the signal to the logic falls below a threshold level.

Hold time of the arrangement is the time constant of capacitor 68 and the input impedance of logic 70. If the operation of a plurality of gyros is to be checked sequentially a ground will be provided on the gate line 90 which turns off the logic 70 during switching between gyros.

What is claimed is:

1. In a device for monitoring the speed of an AC split phase motor, said motor having a line winding and a phased winding, so that a voltage applied to said line winding will produce a phase-modulated back EMF in said phased winding, demodulating means responsive to the phase-modulated back EMF in the phased winding and to the voltage applied to said line winding, and filter means connected to said demodulating means for selecting a voltage caused by hunting of said motor speed relative to a nominal speed.

2. The apparatus of claim 1, wherein said demodulating means comprises a half wave, phase sensitive demodulator connected to both motor windings for demodulating the phase-modulated back EMF with respect to the voltage applied to the line winding.

3. The apparatus of claim 1, wherein said demodulating means includes a phase sensitive detector, which detector provides an electrical output which varies in accordance with the number of degrees of phase shift of the back EMF in said phased winding.

4. The apparatus of claim 1, and further means responsive to the filter means for providing an output when the frequency of the hunting component reaches a predetermined magnitude.

5. The apparatus of claim 1, wherein said demodulating means comprises a field effect transistor wherein the line winding voltage is applied to the gate thereof and the phase-modulated back EMF is applied to the drain circuit thereof, thereby providing a modulation envelope of the phased winding voltage containing a hunting frequency component and an excitation frequency component.

6. The apparatus of claim 5, and diode means connected between said gate and the line winding to prevent positive bias on the gate during positive excursions of the line winding voltage, thus providing half wave demodulation.

* * * * *